United States Patent [19]

Fukuda et al.

[11] Patent Number: 5,412,135

[45] Date of Patent: May 2, 1995

[54] ORGANIC SILICON COMPOUNDS AND CURABLE ORGANOPOLYSILOXANE COMPOSITIONS

[75] Inventors: Kenichi Fukuda; Kouichi Yamaguchi, both of Takasaki; Shinichi Sato, Annaka; Hirofumi Kishita, Annaka; Masatoshi Arai, Annaka; Hironao Fujiki, Takasaki, all of Japan

[73] Assignee: Shin-Etsu Chemical Co., Ltd., Tokyo, Japan

[21] Appl. No.: 230,470

[22] Filed: Apr. 20, 1994

[30] Foreign Application Priority Data

Apr. 21, 1993 [JP] Japan .................................. 5-117943
Apr. 21, 1993 [JP] Japan .................................. 5-117944

[51] Int. Cl.$^6$ ......................... C07F 7/08; C08G 77/06
[52] U.S. Cl. .................................. 556/448; 556/451; 528/12; 528/15
[58] Field of Search ................ 556/448, 451; 528/12, 528/15

[56] References Cited

U.S. PATENT DOCUMENTS

| | | | |
|---|---|---|---|
| 4,968,828 | 11/1990 | Yamamoto | 556/448 |
| 5,043,464 | 8/1991 | Yamamoto | 556/448 X |
| 5,317,073 | 5/1994 | Evans et al. | 528/15 X |

FOREIGN PATENT DOCUMENTS

| | | |
|---|---|---|
| 472215 | 2/1992 | European Pat. Off. . |
| 488709 | 6/1992 | European Pat. Off. . |

*Primary Examiner*—Paul F. Shaver
*Attorney, Agent, or Firm*—Millen, White, Zelano, & Branigan

[57] ABSTRACT

A novel organic silicon compound having at least one ≡SiH group in a molecule and a fluorinated organic group at either end is a useful crosslinking agent for various resins, especially fluorinated resins. An organopolysiloxane composition comprising (A) an organopolysiloxane having in a molecule at least two alkenyl groups and at least one fluorinated substituent, (B) an organohydrogenpolysiloxane having at least two ≡SiH groups in a molecule and a fluorinated organic group at either end, and (C) a platinum catalyst is readily curable to products having solvent and moisture resistance.

9 Claims, No Drawings

ORGANIC SILICON COMPOUNDS AND CURABLE ORGANOPOLYSILOXANE COMPOSITIONS

BACKGROUND OF THE INVENTION

1. Field of the Invention

This invention relates to a novel organic silicon compound having a hydrogen atom directly attached to a silicon atom (or a silylidyne ≡SiH group) in a molecule and a fluorinated group at either end, which is useful as a crosslinking agent for various resins. It also relates to an organopolysiloxane composition which is readily curable to products having solvent and moisture resistance and thus suitable for use as electronic part encapsulants, sealants and coating agents.

2. Prior Art

Heretofore, addition curing type silicone compositions have been used in a variety of fields. These silicone compositions cure by crosslinking through hydrosilylation reaction represented by the following reaction scheme.

$$\equiv SiH + CH_2=CHSi\equiv \xrightarrow{Pt\ compound} \equiv SiCH_2CH_2Si\equiv$$

In this reaction, the siloxane having a ≡SiH group is used as a crosslinking agent. Illustrative examples of the siloxane used are given below.

$$H-\underset{\underset{CH_3}{|}}{\overset{\overset{CH_3}{|}}{Si}}O-\left(\underset{\underset{CH_3}{|}}{\overset{\overset{CH_3}{|}}{Si}}O\right)_a-\underset{\underset{CH_3}{|}}{\overset{\overset{CH_3}{|}}{Si}}-H$$

$$(CH_3)_3SiO-\left(\underset{\underset{CH_3}{|}}{\overset{\overset{CH_3}{|}}{Si}}O\right)_a\left(\underset{\underset{CH_3}{|}}{\overset{\overset{H}{|}}{Si}}O\right)_b-Si(CH_3)_3$$

$$(CH_3)_3SiO-\left(\underset{\underset{CH_3}{|}}{\overset{\overset{CH_2CH_2CF_3}{|}}{Si}}O\right)_a\left(\underset{\underset{CH_3}{|}}{\overset{\overset{H}{|}}{Si}}O\right)_b-Si(CH_3)_3$$

$$C_6H_5Si-\left(\underset{\underset{CH_3}{|}}{\overset{\overset{CH_3}{|}}{Si}}H\right)_3$$

$$\left(H-\underset{\underset{CH_3}{|}}{\overset{\overset{CH_3}{|}}{Si}}O\right)_3-SiCH_2CH_2Si-\left(O\underset{\underset{CH_3}{|}}{\overset{\overset{CH_3}{|}}{Si}}-H\right)_3$$

$$\left[-\underset{\underset{CH_3}{|}}{\overset{\overset{H}{|}}{Si}}O-\right]_4$$

However, when the above-mentioned crosslinking agent is blended in a fluorinated silicone composition having a high fluorine content, the resulting composition is less curable because the agent is incompatible with the composition. Additionally, according to our finding, the composition has another drawback that it lacks adherence. Even when a tackifier is further added to the composition, a cured product obtained therefrom hardly adheres to various substrates.

It was recently proposed to improve compatibility by using as a crosslinking agent a silylidyne (≡SiH) group-containing siloxane compound having a fluorinated group in a side chain represented by the following general formula.

$$(CH_3)_3SiO-\left(\underset{\underset{CH_3}{|}}{\overset{\overset{CH_2CH_2Rf}{|}}{Si}}O\right)_s\left(\underset{\underset{CH_3}{|}}{\overset{\overset{CH_3}{|}}{Si}}O\right)_p\left(\underset{\underset{CH_3}{|}}{\overset{\overset{H}{|}}{Si}}O\right)_q-Si(CH_3)_3$$

In the formula, Rf is a fluorinated substituent selected from groups of the following formulae:

$$F-(CFCF_2O)_n-CF-(CH_2)_m- \\ \quad\quad |\quad\quad\quad\quad\quad | \\ \quad\quad CF_3\quad\quad\quad\quad CF_3$$

$$F-(CFCF_2-O)_n-CFCF_2-(CH_2)_m- \\ \quad\quad |\quad\quad\quad\quad\quad\quad | \\ \quad\quad CF_3\quad\quad\quad\quad\quad CF_3$$

$$C_jF_{2j+1}-(CH_2)_m-$$

wherein m is an integer of 1 to 4, n is an integer of 1 to 6 and j is an integer of 1 to 12.

This siloxane compound, however, is difficult to provide an organopolysiloxane composition which is effectively curable into a well adhesive product because the Rf group in the side chain has steric hindrance to the ≡SiH group. Therefore, it is desired to overcome these problems of curable organopolysiloxane 1.5 compositions.

SUMMARY OF THE INVENTION

An object of the present invention is to provide an organic silicon compound which is well compatible with various resins, typically fluorinated resins, and advantageous as a crosslinking agent for addition curing type fluorinated silicone compositions and other compositions of resins having an aliphatic unsaturated group in that the resulting compositions are effectively curable into products having solvent resistance and water permeability.

Another object of the invention is to provide a curable organopolysiloxane composition which is quickly curable into a product having solvent resistance and moisture resistance and optionally, good adherence when an optional tackifier is added thereto.

We have found that a novel organic silicon compound of the following general formula (1) is obtained by effecting an equilibration reaction between an organohydrogenpolysiloxane of the following general formula (2), a fluorinated disiloxane compound of the following general formula (3) and optionally, a cyclosiloxane of the following general formula (4) in the presence of an acid catalyst, thereby introducing a ≡SiH group into the fluorinated disiloxane compound of formula (3). Since this organic silicon compound has a fluorinated organic group at either end and a hydrogen atom directly attached to a silicon atom, that is, a silylidyne (≡SiH) group in a side chain such that the silylidyne group may advantageously react with an aliphatic unsaturated group without steric hindrance by the fluorinated organic group, it has good affinity to various resins, especially fluorinated silicone resins. When the compound is blended in a composition of a resin having an aliphatic unsaturated group as a crosslinking agent, the compound greatly contributes to an improvement in solvent resistance and water permeability of a cured product of the composition. Particularly when the compound is blended in fluorinated silicone resins, it is a useful crosslinking agent capable of imparting satisfactory curability.

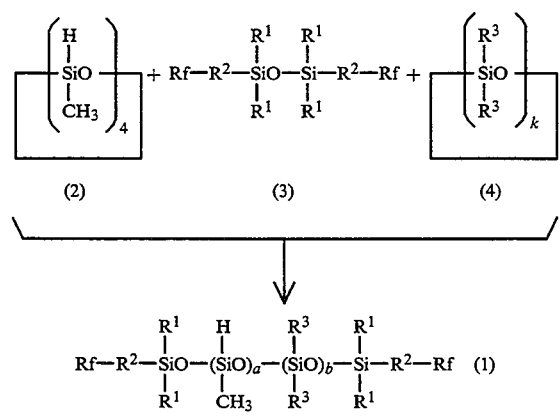

(2)    (3)    (4)

↓

$$Rf-R^2-\underset{\underset{R^1}{|}}{\overset{\overset{R^1}{|}}{Si}}-O-(\underset{\underset{CH_3}{|}}{\overset{\overset{H}{|}}{Si}}O)_a-(\underset{\underset{R^3}{|}}{\overset{\overset{R^3}{|}}{Si}}O)_b-\underset{\underset{R^1}{|}}{\overset{\overset{R^1}{|}}{Si}}-R^2-Rf \quad (1)$$

In the formulae, and $R^1$ and $R^3$ are independently selected from monovalent organic groups, $R^2$ is a divalent organic group, Rf is a perfluoroalkyl group or perfluoropolyether group, and letter a is an integer of at least 1, b is an integer inclusive of 0, and k is equal to 3 or 4.

We have also found that a curable organopolysiloxane composition is obtained by blending (A) an organopolysiloxane having in a molecule at least two alkenyl groups each attached to a silicon atom and at least one fluorinated substituent attached to a silicon atom selected from the following formulae (8), (9), and (10), (B) an organohydrogenpolysiloxane represented by formula (1) and having at least two ≡SiH groups in a molecule, and (C) a platinum group metal catalyst. This composition is quickly curable into a product which is highly solvent resistant in that it experiences reduced volumetric swelling upon immersion in various solvents, low water permeable and moisture resistant, and which has low surface energy so that when a tackifier is optionally added thereto, the cured product has good adherence to various substrates.

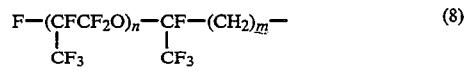

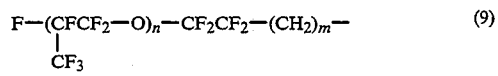

In the formulae, m is an integer of 1 to 4, n is an integer of 1 to 6, and j is an integer of 1 to 12.

Accordingly, the present invention provides a novel and improved organic silicon compound of formula (1) defined above.

The present invention also provides a curable organopolysiloxane composition comprising (A) an organopolysiloxane having in a molecule at least two alkenyl groups each attached to a silicon atom and at least one fluorinated substituent attached to a silicon atom selected from the of formulae (8), (9) and (10), (B) an organohydrogenpolysiloxane represented by formula (1) and having at least two ≡SiH groups in a molecule, and (C) a platinum group metal catalyst.

DETAILED DESCRIPTION OF THE INVENTION

In a first aspect, the present invention provides a novel and improved organic silicon compound of formula (1).

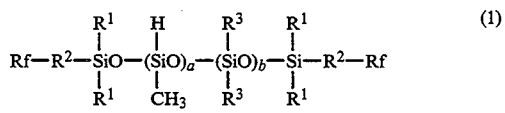

In formula (1), and $R^1$ and $R^2$ are independently selected from monovalent organic groups, $R^2$ is a divalent organic group, Rf is a perfluoroalkyl group or perfluoropolyether group, letter a is a positive integer of at least 1, and letter b is a positive integer inclusive of 0.

The organic groups represented by $R^1$ and $R^2$ are preferably monovalent hydrocarbon groups having 1 to 6 carbon atoms, for example, lower alkyl groups such as methyl and ethyl groups and aryl groups such as phenyl groups.

The divalent organic group represented by $R^2$ is preferably selected from divalent lower alkylene groups having 1 to 4 carbon atoms and lower alkylene groups having an intervening oxygen atom though not limited thereto. Typically $R^2$ is selected from alkylene groups of —$(CH_2)_m$— and —$(CH_2)_m$—O—$CH_2$— wherein m is an integer of 1 to 4.

Rf is a perfluoroalkyl group or a perfluoropolyether group, preferably selected from the following formulae (5) to (7):

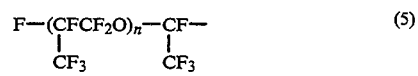

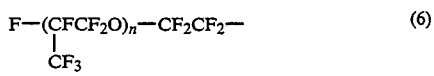

wherein n is an integer of 1 to 6 and j is an integer of 1 to 12.

In formula (1), letter a is an integer of at least 1, which means that the organic silicon compound of formula (1) contains at least one hydrogen atom attached to a silicon atom, that is, ≡SiH group in a molecule. Preferably a is an integer of at least 2, more preferably 4 to 100 on average. Letter b is 0 or an integer of 1 or more, with the upper limit of b being preferably 50.

Illustrative, non-limiting examples of the organic silicon compound of formula (1) are given below.

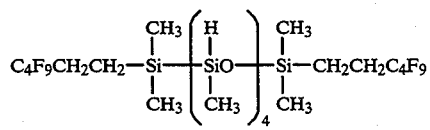

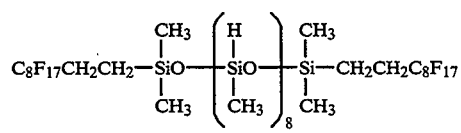

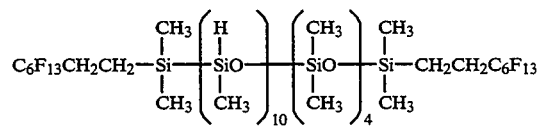

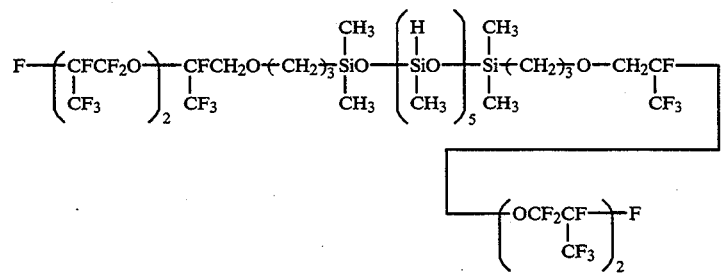

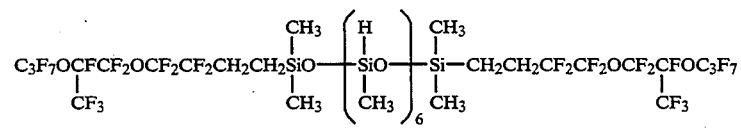

The organic silicon compound of formula (1) can be prepared, for example, by effecting an equilibration reaction between an organohydrogenpolysiloxane of the following general formula (2), a fluorinated disiloxane compound of the following general formula (3) and optionally, a cyclosiloxane of the following general formula (4) in the presence of an acid catalyst.

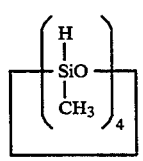 (2)

 (3)

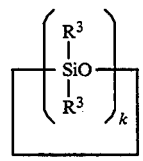 (4)

In the formulae, $R^1$, $R^2$ and Rf are as defined above, and letter k is equal to 3 or 4.

No particular limit is imposed on the mix proportion between the organohydrogenpolysiloxane of formula (2), the fluorinated disiloxane compound of formula (3), and the optional cyclosiloxane of formula (4).

Letter a in formula (1), representative of the number of SiH units, can be controlled to an appropriate value for a particular purpose by adjusting the proportion of the organohydrogenpolysiloxane of formula (2) used in the reaction. In this way, the number of SiH groups in a molecule can be changed.

The acid catalysts used herein include, for example, sulfuric acid, sulfuric anhydride, and trifluoromethylsulfonic acid. The catalyst may be added in a catalytic amount.

Preferred conditions for the equilibration reaction include a temperature of about 20° to 150° C. and a time of about 1 to 24 hours though such is not critical.

The organic silicon compound of formula (1) is effective as a single compound or a mixture of two or more compounds. In a common practice, a mixture of organic silicon compounds of formula (1) is obtained by effecting the above-mentioned equilibration reaction, and removing the unreacted disiloxane and preferably the organic silicon compound of formula (1) wherein a=1 by stripping. This mixture is a useful crosslinking agent.

Since the organic silicon compound has fluorinated groups at both ends and a hydrogen atom directly attached to a silicon atom, that is, silylidyne (≡SiH) group in a side chain, the silylidyne group can react with an aliphatic unsaturated group (for example, alkenyl group, typically vinyl) without steric hindrance by the fluorinated organic group, allowing addition reaction to proceed smoothly. The compound has good affinity to various resins, especially fluorinated silicone resins. When the compound is blended in an addition reaction type resin composition as a crosslinking agent, the compound greatly contributes to an improvement in solvent resistance and moisture permeability of a cured product of the composition. In particular, the compound is a useful crosslinking agent capable of imparting satisfactory curability to fluorinated silicone resins.

In a second aspect, the present invention provides a curable organopolysiloxane composition comprising (A) an organopolysiloxane having alkenyl groups and a fluorinated substituent, (B) an organohydrogenpolysiloxane, and (C) a platinum group metal catalyst.

Component (A) is an organopolysiloxane having in a molecule at least two alkenyl groups each attached to a silicon atom and at least one fluorinated substituent attached to a silicon atom. The fluorinated substituent is selected from the following formulae (8), (9) and (10):

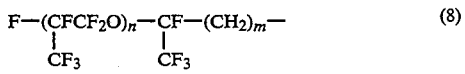
(8)

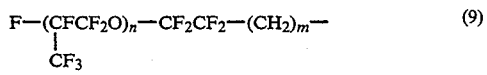
(9)

(10)

wherein m is an integer of 1 to 4, n is an integer of 1 to 6, and j is an integer of 1 to 12.

Preferably the organopolysiloxane has a viscosity of about 500 to about 50,000 centistokes at 25° C. though the viscosity is not limited thereto.

The alkenyl groups contained in the organopolysiloxane are typically vinyl and allyl groups which are preferred from a practical standpoint although other alkenyl groups may be used.

In addition to the alkenyl groups and fluorinated substituent, the organopolysiloxane may further contain a substituent attached to a silicon atom, preferably a monovalent hydrocarbon group having 1 to 8 carbon atoms, for example, alkyl groups such as methyl, ethyl, propyl and butyl groups and aryl groups such as phenyl groups.

Illustrative preferred examples of the organopolysiloxane are those of the following general formula (11):

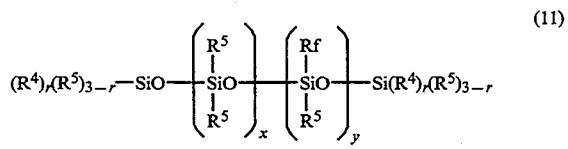
(11)

wherein $R^4$ groups, which may be identical or different, are alkenyl groups (e.g., vinyl and allyl groups), $R^5$ groups, which may be identical or different, are alkyl groups having 1 to 8 carbon atoms (e.g., methyl, ethyl, propyl and butyl groups) or aryl groups (e.g., phenyl groups), Rf is a fluorinated substituent represented by formula (8), (9) or (10), preferably a group represented by

letters r, x and y are integers in the range of $0 \leq r \leq 3$, $x \geq 1$, and $y \geq 0$.

Because of advantages in practical use, more preferred among the organopolysiloxanes of formula (11) are those of the following general formulae which are blocked with a vinyl group at either end.

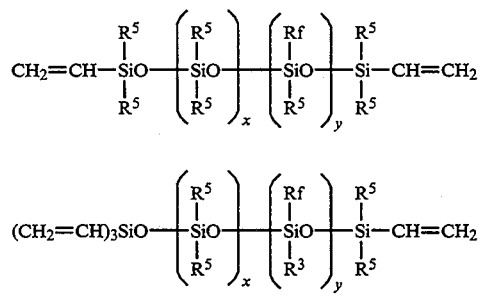

In the formulae, $R^5$, x and y are as defined above.

The organopolysiloxane of formula (11) can be prepared, for example, by effecting an equilibration reaction of an organopolysiloxane having a fluorinated substituent of the following general formula (12), a vinyl end-blocked organopolysiloxane of the following general formula (13) and optionally, an organocyclotrisiloxane of the following general formula (14) in an appropriate mix proportion in the presence of an acid or alkali polymerization catalyst for performing a polymerization reaction.

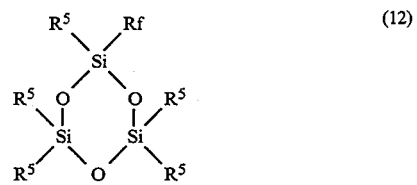
(12)

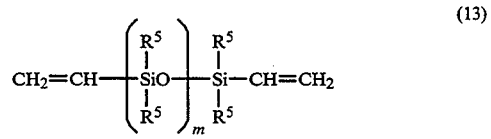
(13)

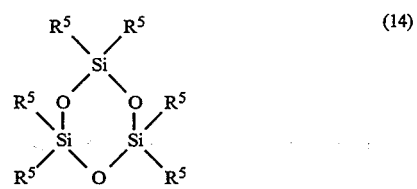
(14)

In the formulae, $R^5$ and Rf are as defined above and m is an integer of at least 1.

The polymerization catalysts used herein include ring-opening polymerization catalysts such as lithium catalysts and penta-coordinate silicon catalysts of the following formula (15). The polymerization catalyst may be added in a catalytic amount.

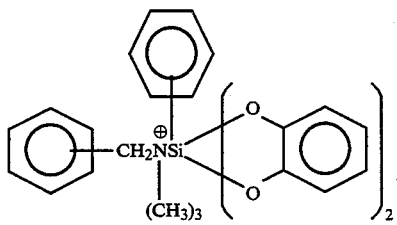

At the end of polymerization reaction, the resulting polymer is terminally treated with an organic silicon compound of the following general formula (16):

wherein $R^5$ is as defined above and X is $NH_2$, $OCCH_3$ or Cl. There is obtained a polymer having a very low content of low molecular weight siloxanes.

Component (B) is an organohydrogenpolysiloxane which serves as a crosslinking agent. It is represented by the general formula (1) and contains at least two hydrogen atoms each attached to a silicon atom in a molecule. This organohydrogenpolysiloxane containing at least two SiH groups in a molecule is represented by the following general formula (1').

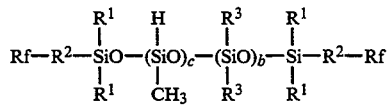

wherein $R^2$, $R^2$, $R^3$, Rf and b are as defined above, and letter c is an integer of at least 2.

Preferred in the composition of the invention is an organohydrogenpolysiloxane of formula (1') wherein $R^2$ is a group $-(CH_2)_m-$ wherein m is an integer of 1 to 4.

Component (A) or organopolysiloxane and component (B) or organohydrogenpolysiloxane are preferably blended in such a ratio that at least ½ hydrogen atom attached to a silicon atom in component (B) is available per alkenyl group attached to a silicon atom in component (A), more preferably the ratio of alkenyl group attached to a silicon atom in component (A) to hydrogen atom attached to a silicon atom in component (B) may be from 1:0.5 to 1:10, especially from 1:1 to 1:5. A smaller amount of component (B) below the above-defined proportion would sometimes cause short curing whereas a larger amount of component (B) beyond the above-defined proportion would sometimes invite insufficient curing and detract from physical properties such as rubber strength.

In the practice of the invention, a component (C) capable of promoting addition reaction between components (A) and (B) is added to the composition. It is a platinum group metal catalyst. Examples include platinum group metals such as platinum, rhodium and iridium and compounds thereof, especially chloroplatinic acid, complexes of chloroplatinic acid with olefins and vinylsiloxanes, platinum black, and platinum on various supports. The catalyst is added in a catalytic amount sufficient for the silicone composition to cure through addition reaction, preferably in an amount to give about 1 to 1,000 ppm of platinum element based on the total weight of components (A) and (B).

The composition of the invention is prepared simply by blending predetermined amounts of components (A), (B) and (C). If necessary, a tackifier may be added for improving the adhesion of the composition. One preferred tackifier is $CF_3CH_2CH_2Si(OCH_3)_3$, which may be added in an amount of 0.1 to 5 parts by weight per 100 parts by weight of component (A).

Various additives may be added to the composition of the invention as optional components. There may be used any of those additives commonly used in conventional silicone rubber compositions. Included are reinforcing silica fillers such as fumed silica and silica aerogel; extending fillers such as diatomaceous earth, ground quartz, carbon black, and calcium carbonate; thermal stabilizers; anti-oxidants; and pigments. These optional additives may be added in conventional amounts insofar as the benefits of the invention are not lost.

The curable organopolysiloxane composition of the invention can be briefly cured by heating it at a temperature of about 70° to 180° C. to induce addition reaction between components (A) and (B). More particularly, the composition can be cured within about 15 minutes by heating at a temperature of 100° C. or higher, especially 120° C. or higher. Cure is complete and the cured product is improved in various properties.

The curable organopolysiloxane composition is quickly curable into a product which is highly solvent resistant and moisture resistant and which has low surface energy so that when a tackifier is added thereto, the cured product has good adherence to various substrates. Therefore the composition is advantageously used as electron part encapsulants, sealants and coating compositions.

EXAMPLE

Examples of the present invention are given below together with comparative examples by way of illustration and not by way of limitation. All parts are by weight.

Example 1

A 100-ml three-necked flask equipped with a stirrer, condenser and thermometer was charged with 36.2 grams (0.033 mol) of a disiloxane of formula (17) and 15.9 grams (0.066 mol) of a cyclosiloxane of formula (18) with stirring. The system was purged with nitrogen and 0.15 grams (0.001 mol) of $CF_3SO_3H$ was added thereto. Equilibration reaction was carried out at 80° C. for 16 hours. At the end of reaction, the reaction solution was cooled down to room temperature. Water, 2 grams, was added to the solution and the mixture was agitated for one hour. The aqueous layer was separated off. The remaining solution was washed with saturated sodium sulfate water, obtaining 45.3 grams of a mixture of compounds of formula (19) wherein r is an integer inclusive of 0 and its average value is 8.

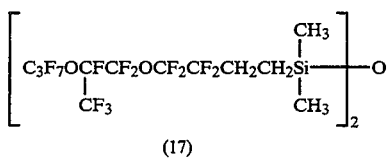

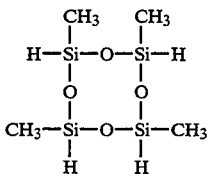

(17)  (18)

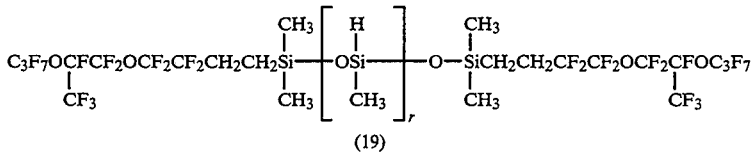

(19)

Next, the mixture of compounds of formula (19) was stripped at 150° C. ad $1\times10^{-4}$ Torr to distill off the siloxane compounds of formula (19) wherein r=0 and 1, obtaining 20.3 grams of a mixture of compounds of formula (19) wherein r is 2 or more. On analysis, the compound was identified to have the structure of formula (20) wherein s is an integer of 2 or more and its average value is 12.

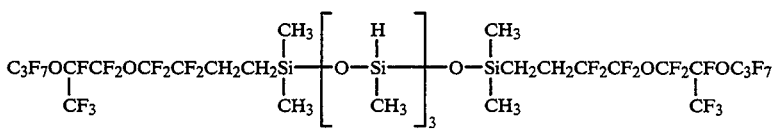

(20)

|  | Elemental analysis | | | |
|---|---|---|---|---|
|  | C | H | Si | F |
| Calcd. (%) | 23.86 | 3.78 | 21.70 | 35.65 |
| Found (%) | 23.52 | 3.84 | 22.11 | 35.47 |

*calculated as $C_{36}H_{68}O_{17}F_{34}Si_{14}$

IR absorption spectrum

A characteristic absorption peak attributable to a SiH group appeared at a wave number of 2170 cm$^{-1}$.

Si-H quantity

Calcd.: $6.63\times10^{-1}$ mol/g
  Found: $6.77\times10^{-3}$ mol/g $^1$H-NMR spectrum: (TMS standard)
  σ=4.67 ppm (—SiH, m, 12H)
  σ=0.20 ppm (—Si—CH$_3$, m, 48H)
  σ=0.53–1.00 ppm (Si—CH$_2$—C, m, 4H)
  σ=1.80–2.77 ppm (CF—CH—C$_2$—C, m, 4H)

$^{19}$F—NMR spectrum: (CF$_3$COOH standard)
  σ=−3.79 ppm (—CF)CF$_3$)CF$_2$—, 6F)
  σ=−5.19 ppm (CF$_3$CF$_2$CF$_2$—, 10F)
  σ=−7.09 ppm (—CF(CF$_3$)CF$_2$—, 4F)
  σ=−11.05 ppm (—CF$_2$CF$_2$CH$_2$—, 4F)
  σ=−43.43 ppm (—CF$_2$CF$_2$CH$_2$—, 4F)
  σ=−53.10 ppm (—CF$_2$CF$_2$CF$_2$—, 4F)
  σ=−68.70 ppm (—CF(CF$_3$)CF$_2$—, 2F)

Example 2

A reactor as used in Example 1 was charged with 50.0 grams (0.049 mol) of disiloxane of formula (21) and 23.4 grams (0.098 mol) of a cyclosiloxane of formula (18) with stirring. The system was purged with nitrogen and 0.15 grams (0.001 mol) of CF$_3$SO$_3$H was added thereto. Reaction and post-treatment were carried out as in Example 1, obtaining 70.3 grams of a mixture of compounds of formula (22) wherein t is an integer inclusive of 0 and its average value is 8.

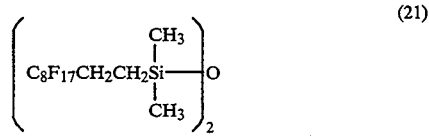

(21)

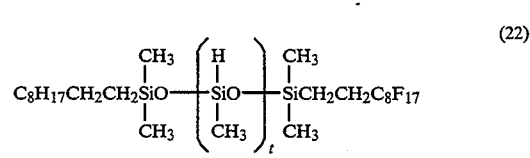

(22)

Next, the mixture of compounds of formula (22) was stripped at 150° C. and $1\times10^{-2}$ Torr to distill off the siloxane compound of formula (22) wherein t=0, obtaining 58.8 grams of a mixture of compounds of formula (19) wherein r is 1 or more. On analysis, the compound was identified to have the structure of formula (23) wherein u is an integer of 1 or more and its average value is 10.

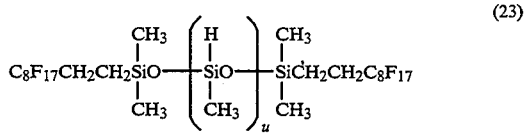

(23)

|  | Elemental analysis | | | |
|---|---|---|---|---|
|  | C | H | Si | F |
| Calcd. (%) | 25.24 | 3.12 | 20.83 | 39.93 |
| Found (%) | 24.97 | 3.22 | 20.54 | 40.16 |

*calculated as $C_{34}H_{50}O_{11}F_{34}Si_{12}$

IR absorption spectrum

A characteristic absorption peak attributable to a SiH group appeared at a wave number of 2170 cm$^{-1}$.

Si—H quantity

Calcd.: $6.64 \times 10^{-3}$ mol/g
Found: $6.79 \times 10^{-3}$ mol/g
$^1$H-NMR spectrum: (TMS standard)
$\sigma = 4.59$ ppm (—Si—H, m, 10H)
$\sigma = 0.18$ ppm (—Si—CH$_3$, m, 42H)
$\sigma = 0.56-1.08$ ppm (Si—CH$_2$—C, m, 4H)
$\sigma = 1.76-2.75$ ppm (CF—CH$_2$—C, m, 4H)

$^{19}$F-NMR spectrum: (CF$_3$COOH standard)

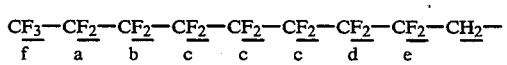

a: —49.8 ppm (4F)

b: —47.3 ppm (4F)

c: —46.9 ppm (12F)

d: —45.3 ppm (4F)

e: —37.5 ppm (4F)

f: —4.8 ppm (6F)

Example 3

To 100 parts of a vinyl group-containing organopolysiloxane polymer of formula (24) was added 15 parts of fumed silica filler which had been treated with a trimethylsiloxane group. They were manually mixed, heat treated and then milled by a three-roll mill.

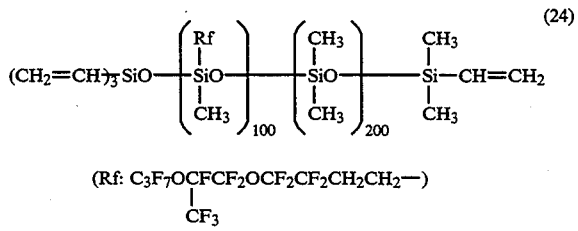

(Rf: C$_3$F$_7$OCFCF$_2$OCF$_2$CF$_2$CH$_2$CH$_2$—)
       |
       CF$_3$

To the mixture were added 1.83 parts of an organohydrogenpolysiloxane of formula (25), 0.2 parts of carbon black, 0.2 parts of a platinum catalyst solution, and 0.3 parts of 2-ethynylisopropanol. The catalyst solution was a dilution of chloroplatinic acid modified with CH$_2$=CHSi(CH$_3$)$_2$OSi(CH$_3$)$_2$CH=CH$_2$ in a vinyl group-containing polysiloxane, having a platinum concentration of 0.5% by weight. Mixing gave a curable organopolysiloxane composition.

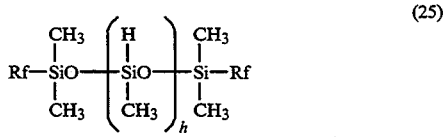

In formula (25), Rf is as defined above and h has an average value of 12.

The composition was deaerated in vacuum, placed in a rectangular press frame, deaerated again, press cured at 120 kgf/cm$^2$ and 150° C. for 10 minutes, and heat treated at 150° C. for 50 minutes. A test piece was cut out from the cured block and measured for rubber properties according to JIS K-6301, finding a tensile strength of 32 kgf/cm$^2$, a tear strength of 4.9 kgf/cm, an elongation of 371%, a hardness of 25, and a specific gravity of 1.46 g/cm$^3$. The cured sample had a minimized volumetric swell upon solvent immersion and a low water permeability.

Additionally, 0.5 parts of CF$_3$CH$_2$CH$_2$Si(OCH$_3$)$_3$ was added to the composition which was coated and cured to an aluminum plate and an epoxy coated plate (the epoxy coating contained a nitrogen compound). The composition firmly bonded to both the plates.

Comparative Example

An organopolysiloxane composition was prepared by the same procedure as in Example 3 except that 3.25 parts of a compound of formula (26) was added instead of the organohydrogenpolysiloxane of formula (25).

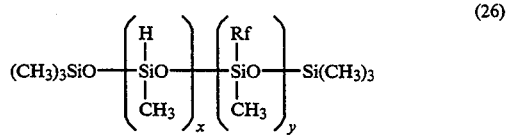

In formula (26), Rf is as defined above, x has an average value of 6, and y has an average value of 2.

The composition was cured into a block which had a tensile strength of 25 kgf/cm$^2$, a tear strength of 10.4 kgf/cm, an elongation of 388%, and a hardness of 20, indicating insufficient cure.

As in Example 3, CF$_3$CH$_2$CH$_2$Si(OCH$_3$)$_3$ was added to the composition which was coated and cured to an aluminum plate and an epoxy coated plate. The composition bonded firmly to the aluminum plate, but weakly to the epoxy coated plate with interfacial separation.

Japanese Patent Application Nos. 5-117943 and 5-117944 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An organic silicon compound of the following formula (1):

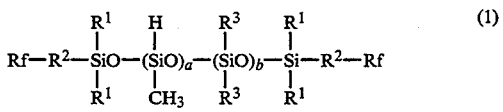

wherein R$^1$ and R$^3$ are independently selected from monovalent organic groups, R$^2$ is a divalent organic group, Rf is a perfluoroalkyl group or perfluoropolyether group, and letter a is an integer of at least 1 and b is 0 or a positive integer.

2. The compound of claim 1 wherein a has an average value of 4 to 100.

3. The compound of claim 1 wherein

R$^1$ and R$^3$ are independently selected from monovalent hydrocarbon groups having 1 to 6 carbon atoms, R$^2$ is a group represented by —(CH$_2$)$_m$— or —(CH$_2$)$_m$—O—CH$_2$ wherein m is an integer of 1 to 4, and Rf is selected from of the following formulae (5) to (7):

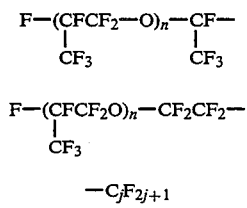
(5)

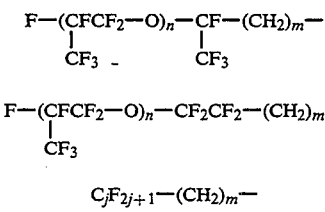
(6)

$$-C_jF_{2j+1}$$ (7)

wherein n is an integer of 1 to 6 and j is an integer of 1 to 12.

4. A curable organopolysiloxane composition comprising
(A) an organopolysiloxane having in a molecule at least two alkenyl groups each attached to a silicon atom and at least one fluorinated substituent attached to a silicon atom selected form the following formulae (8), (9) and (10):

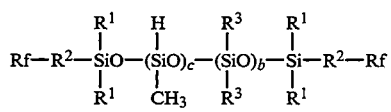
(8)

$$F-(CFCF_2-O)_n-CF_2CF_2-(CH_2)_m-$$
$$\phantom{F-(}CF_3$$
(9)

$$C_jF_{2j+1}-(CH_2)_m-$$ (10)

wherein m is an integer of 1 to 4, n is an integer of 1 to 6, and j is an integer of 1 to 12,
(B) an organohydrogenpolysiloxane of the following formula (1'):

$$\begin{array}{ccccc} R^1 & H & R^3 & R^1 \\ | & | & | & | \\ Rf-R^2-SiO-(SiO)_c-(SiO)_b-Si-R^2-Rf \\ | & | & | & | \\ R^1 & CH_3 & R^3 & R^1 \end{array}$$ (1')

wherein $R^1$ and $R^3$ are independently selected from monovalent organic groups, $R^2$ is a divalent organic group, Rf is a perfluoroalkyl group or perfluoropolyether group, and letter c is an integer of at least 2 and b is 0 or a positive integer inclusive of 0, and
(C) a platinum group metal catalyst.

5. The compound of claim 1, wherein b is from 0 to 50.

6. The composition of claim 4, wherein the at least two alkenyl groups are independently a vinyl group or allyl group.

7. The composition of claim 4, wherein the organopolysiloxane (A) is of the formula (11)

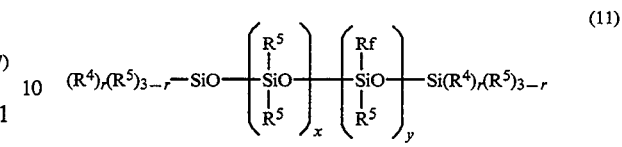
(11)

wherein the $R^4$ groups are independently alkenyl groups, the $R^5$ groups are independently alkyl groups having t to 8 carbon atoms or aryl groups, Rf is a fluorinated substituent represented by formula (8), (9) or (10) in claim 4, and letters r, x and y are integers in the range of $0 \leq r \leq 3$, $x \geq 1$, and $y \geq z\ 0$.

8. The composition of claim 4, wherein, in the organohydrogenpolysiloxane (B),
$R^1$ and $R^3$ are independently selected from monovalent hydrocarbon groups having 1 to 6 carbon atoms,
$R^2$ is a group represented by $-(CH_2)_m-$ or $(CH_2)_m-O-CH_2-$ wherein m is an integer of 1 to 4, and
Rf is selected from the following formulae (5) to (7):

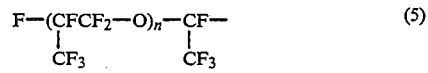
(5)

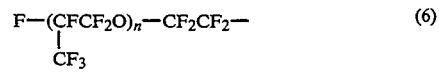
(6)

$$-C_jF_{2j+1}$$ (7)

wherein n is an integer of 1 to 6 and j is an integer of 1 to 12.

9. The composition of claim 4, wherein the organopolysiloxane (A) and organohydrogenpolysiloxane (B) are present in amounts such that the ratio of alkenyl groups attached to silicon atoms in (A) to hydrogen atoms attached to silicon atoms in (B) is from 1:0.5 to 1:10.

* * * * *